July 7, 1964 T. P. RODENKIRCHEN 3,140,096
PISTON RING ASSEMBLY WITH IMPROVED BEARING CONTACT
Filed Jan. 2, 1962 2 Sheets-Sheet 1

INVENTOR.
THEODORE P. RODENKIRCHEN
BY
Sutherland, Colster & Taylor
ATTORNEYS

July 7, 1964  T. P. RODENKIRCHEN  3,140,096
PISTON RING ASSEMBLY WITH IMPROVED BEARING CONTACT
Filed Jan. 2, 1962  2 Sheets-Sheet 2
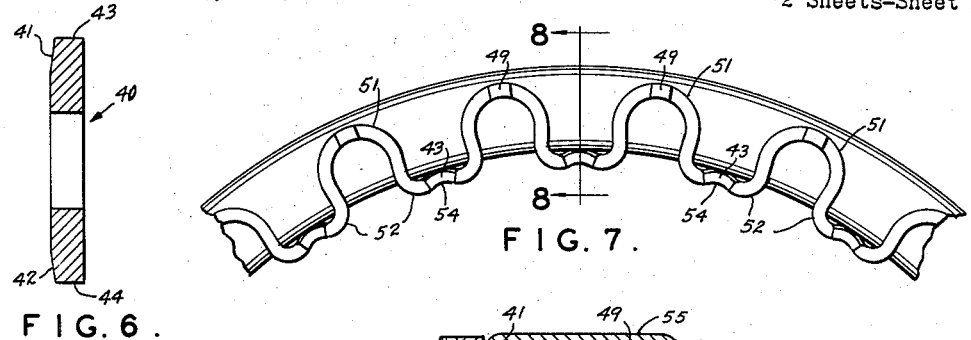
FIG. 6.
FIG. 7.
FIG. 8.
FIG. 10.
FIG. 9.
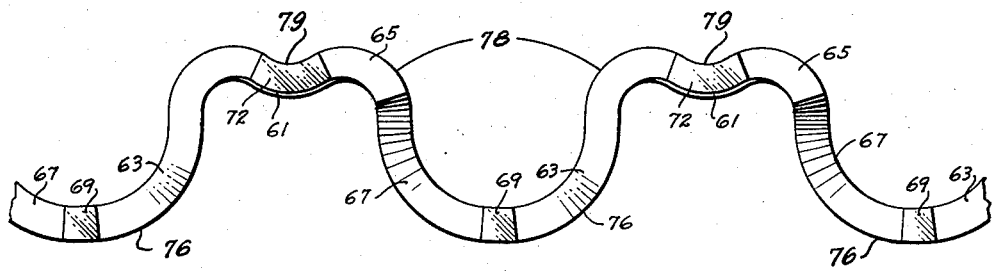
FIG. 11.
INVENTOR.
THEODORE P. RODENKIRCHEN
BY
Sutherland, Polster & Taylor
ATTORNEYS

United States Patent Office 3,140,096
Patented July 7, 1964

3,140,096
PISTON RING ASSEMBLY WITH IMPROVED
BEARING CONTACT
Theodore P. Rodenkirchen, Mehlville, Mo., assignor to McQuay-Norris Manufacturing Company, St. Louis, Mo., a corporation of Delaware
Filed Jan. 2, 1962, Ser. No. 163,462
6 Claims. (Cl. 277—141)

This invention relates to piston rings of the full-floating, or non-bottoming, type primarily for use in internal combustion engines and more particularly to a piston ring assembly of annular expansible piston rings and an expander-spacer ring, which assembly of rings can be used for the single purpose of oil control, or for a dual purpose of oil control and compression control. In such an assembly, the annular expansible piston rings are split or lap joint rings of a configuration in cross-section to suit the designed purpose of a compression ring or of an oil ring, or both, and are resilient to be expansible and compressible. The assembly includes a resilient spring ring. In this invention, the spring is an expander-spacer ring with a plurality of annularly spaced, spring pressed elements so constructed and arranged as to engage the piston rings and provide predetermined control of piston ring spacing, radial expansive force exerted on the piston rings, and axial expansive force on the piston rings, all in a manner explained in a prior patent to Mayfield 3,004,811 of October 17, 1961.

As in the aforesaid patent, it is one of the objects of this invention to provide an improved spacer-expander ring for a piston ring assembly in which the spring action of the spacer-expander ring is applied to the piston ring, or rings, in both the axial and radial directions of these piston rings.

It is another object of this invention to provide a spacer-expander ring for a piston ring assembly which has improved bearing contact with the piston ring, or rings, to allow relative friction free movement, improved sensitivity of response, and inherently self-equalizing adjustment of the spacer-expander ring in the assembly.

According to this invention, the improved spacer-expander ring is a ribbon of spring steel, or the like, formed with a repeating pattern along its opposite edges and then bent in opposite directions, alternately, to form a split annular shaped spring ring when its opposite ends are in contact. This ring is definitely compressible and expansible circumferentially. Each bend in the annular ring is oriented with respect to the repeating pattern along its opposite edges so as to provide circular rows of bearing points at its outer and inner peripheries with the inner circular row projecting axially of the ring beyond the outer circular row an amount sufficient to engage an internal circular periphery on a piston ring element. The outer circular row is co-planar and engages a radial face of a piston ring element to act as a ring spacer in the piston ring groove. The bends, which form radially inwardly extending humps, are corrugated axially to obtain strength in both an axial and circumferential direction of the annular spring. On the other hand, the bends extending radially outwardly form humps that are preferably smooth curves when viewed axially. These portions are the spring portions of the ring, since they are relatively flexible.

Wherever the spring ring contacts a piston ring, the contact is limited to what might be termed point contact since it is one of definitely small area as compared with the exposed surfaces present on a piston ring. This type of contact permits what is believed to be the necessary freedom of action between the rings in the assembly to give sensitivity of response and self-equalizing spring movement, both of which are important for uniform spring action and uniform piston ring control. The point contact on what might be termed the spacer humps in the outer annular row is formed by relieving the edges of the strip at each side of a crest of a hump. The inner circular row of bearing points are obtained in a different manner. These are axially extending conical surfaces at the ends of a corrugation in the ring. These conical surfaces can be said to be tangent with an inner circular periphery of a piston ring. Due to the expansive energy stored in the spring ring, these conical surfaces produce a radially and axially outwardly directed force at the inner periphery engaged on the piston ring. The conical surfaces are convex portions on a corrugated tab which define the locus of engagement with the ring. The bearing area of the conical tab surfaces is very small and relatively friction free so that an improved sensitivity of response is obtained in the piston ring assembly.

Other objects and advantages of this invention will occur to those skilled in the art from the following detailed description which is in such clear, concise and exact terms as to enable any one skilled in the art to make and use the same when taken with the accompanying drawings, forming a part thereof, and in which:

FIG. 6 is a transverse sectional view taken approximately on the line 6—6 of FIG. 5;

FIG. 7 is a top plan view of a piston ring assembly with the upper piston ring element removed to illustrate the relation between the piston ring and the strip after it is corrugated to form the spacer-expander;

FIG. 8 is a transverse section of a complete piston ring assembly taken approximately on the line 8—8 of FIG. 7;

FIG. 9 is a plan view of a strip with still another edge configuration which may be used in a spacer-expander control ring;

FIG. 10 is a transverse sectional view taken approximately on the line 10—10 of FIG. 9; and FIG. 11 is a top plan view of the strip 9 after corrugation to form a spacer-expander control ring.

Figure 1:
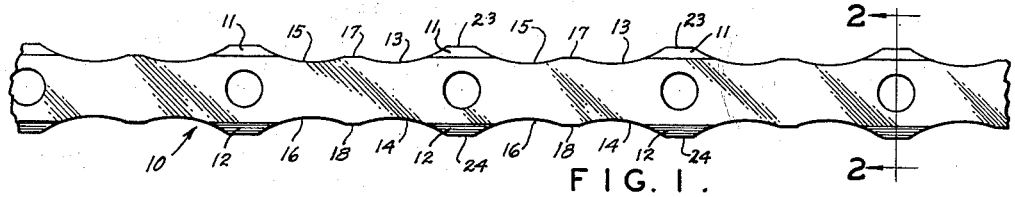
FIG. 1 is a plan view of a strip of spring material illustrating the repeating pattern formed in opposite edges thereof.
Figure 2:
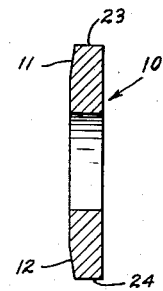
FIG. 2 is a transverse sectional view taken on the line 2—2 of FIG. 1.

Referring now to FIGS. 1 and 2, the spacer-expander ring, according to this invention, is constructed from a spring strip of metal, such as 10. The strip 10 is preferably chamfered on its forward face adjacent each edge, as at 11 and 12. The degree of chamfer is preferably in the range of 7°. Width of the chamfer, of course, is controlled primarily by the thickness of the piston ring element with which the spacer-expander will be used. By this, it is meant the surface on the piston ring to be engaged by the chamfered edges 11 and 12. Strip 10 is formed with a repeating pattern of arcuate notches 13 and 15 at its upper edge and 14 and 16 at its lower edge. These arcuate notches leave small flats, such as 17 and 18, since they do not actually meet. Preferably, the flats 17 and 18 form point contact with the rails as will be later pointed out and have a length in the range of about one-hundredth of an inch. In other words, these flats 17 and 18 are purposely provided to improve the spacing function of the ring. Manufacturing tolerances would make it practically impossible to control accurately the spacing of the portions 17 and 18 if they were formed by points defined by intersection of the arcuate notches 13 and 15 or 14 and 16, for example. For all practical purposes, they amount to points.

Figure 3:
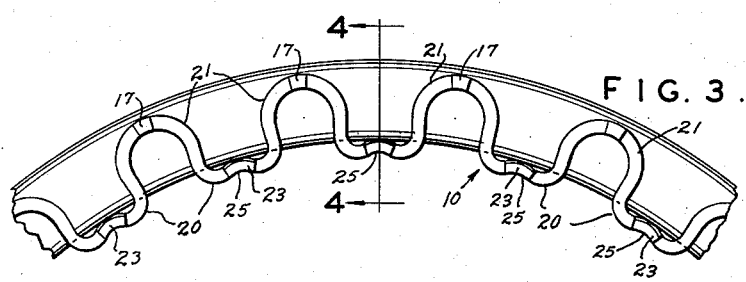
FIG. 3 is a top plan view of a piston ring assembly with the upper piston ring element removed to illustrate the corrugated spacer-expander ring made from the strip shown in FIG. 1.

Turning now to FIG. 3, the ring 10 is corrugated, and these corrugations are oriented with the repeating pattern on the edges of the ring so as to provide a plurality of bends in the ring which form the inwardly extending humps 20 and outwardly extending humps 21. The outwardly extending humps have the flat portions 17 and 18 located at the crest of the outwardly extending humps 21. The inwardly extending humps have the tabs 23 and 24 located at the crest of the inwardly extending humps 20. The inwardly extending humps 20 are also corrugated at 25 to provide axial and circumferential reinforcement to this inwardly extending portion of the spacer-expander ring 10.

When the piston ring elements are assembled with suitable piston rings, or rails, 30 and 31, the outwardly projecting humps 21 with their opposed control points 17 and 18 act as spacers for the piston rings 30 and 31. The inner humps 20 are corrugated as at 25 to form the reinforcement for tabs 23 and 24 which project beyond the opposed inner surfaces of the piston ring elements 30 and 31 so that the bevels 11 and 12 engage the inner periphery of the two piston rings 30 and 31. Corrugation 25 provides the necessary stiffness and by its very nature provides a somewhat conical surface at 11 and 12 which will bear against the piston ring inner peripheries. As will be readily apparent, the outer humps 21 form the flexible or spring portions of the spacer-expander 10, and, when opposite ends of the spacer-expander are engaged and the ring in operative position with respect to a cylinder wall, the outer humps 21 will be compressed to some extent. The outer humps 21 are the springs which, when compressed, provide a circumferential expanding force when the piston ring assembly is in operative condition. This circumferential expanding force will cause the conical surfaces 11 and 12 to exert a radially outwardly directed force and an axially directed force on the piston ring elements 30 and 31. The radial outwardly directed force tends to expand the piston ring elements 30 and 31 thereby exerting a force holding the outer edges of the piston ring in operative engagement with a cylinder wall. The axial outwardly directed forces exerted by the conical surfaces 11 and 12 due to their angularity tends to hold the outer radial face of each piston ring element 30 and 31 in engagement with the side of the ring groove in the piston. The surfaces 11 and 12 do not have to be perfect conical surfaces in order to perform this function, and it is entirely possible that in corrugation of the ring the surfaces 11 and 12 may not be formed as perfect surfaces of a cone. If these surfaces, 11 and 12, were true cones, the contact with the rear edge of the rails 30 and 31 would be at a point on each of these surfaces. In actual manufacturing practice however, corrugations 25 may depart from true circular configuration which would give more of a line contact between surfaces 11 and 12 and the rear edges of the piston rings 30 and 31. In other words, there may be some slight departure from true point contact between the rails 30, 31 and surfaces 11, 12, 17 and 18.

Figure 5:
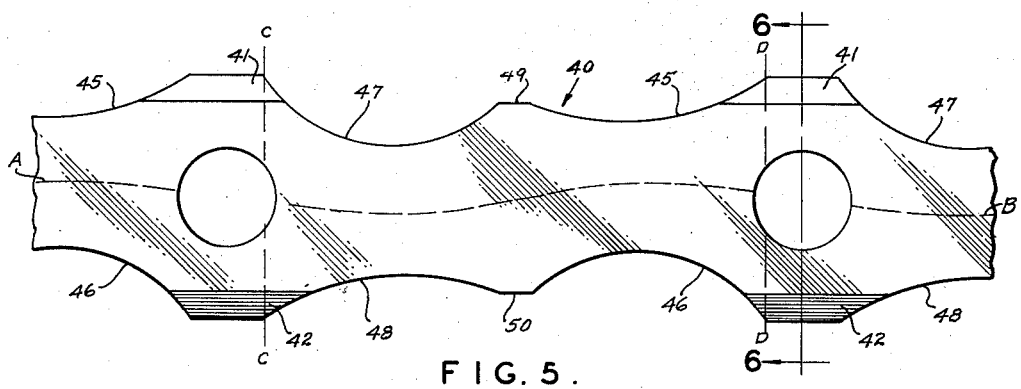
FIG. 5 is a plan view illustrating a modified form of edge configuration which may be used instead of that shown in FIG. 1.

Turning now to FIGS. 5 and 6, in this modification the spacer-expander ring 40 is made from a strip of spring steel, or the like, with chamfered edges 41 and 42, as shown more clearly in FIG. 6. The strip 40 is formed with a repeating pattern of notches in its opposite edges, which pattern is spaced so that the bevelled edges 41 and 42 are on tabs 43 and 44. Arcuate cut-outs 45 and 47 made in one edge and the arcuate cut-outs 46 and 48 in the opposite edge so as to provide the control points 49 and 50. Because of manufacturing variations, the control point 49 is not actually at the intersection of the cut-outs 45 and 47, nor is the control point 50 actually at the intersection of the cut-outs 46 and 48. It is preferable to form the control points 49 and 50 by separate spaced dies so that the distance between the two will be accurate. Arcuate cut-out 46 is the mirror image of the arcuate cut-out 47 and arcuate cut-out 45 is the mirror image of arcuate cut-out 48. Dotted line AB on FIG. 5 indicates the line of mean strip width between the center line of one tab 43 and the center line of the next. The line AB indicates the effective length of the spring portion between the line CC and DD. When the strip 40 is subsequently corrugated, the actual spring portion will be formed by a strip of metal having an effective length along the line AB between the two lines CC and DD. Consequently, it will be seen that by varying the size and shape of the arcuate cut-outs, changes in spring frequency and spring rate can be obtained along the line AB and between the lines CC and DD.

Figure 4:
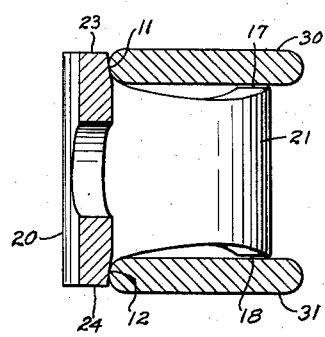
FIG. 4 is a transverse sectional view through a piston ring assembly taken approximately on the line 4—4 of FIG. 3.

As shown in FIG. 7, the corrugations formed in the spacer-expander 40 are oriented with the edge configuration so as to form a corrugated ring with outer flexible humps 51 and inner relatively inflexible humps 52, all in the same manner as heretofore described. The inner flexible humps are axially corrugated at 54 so as to reinforce this portion of the spacer-expander ring against flexing. The tabs 43 and 44, which lie at the extremes of the corrugation 54, form the conical-like bearing surfaces with the inner edge of a piston ring, as shown in FIG. 8. These conical surfaces 41 and 42 bear against the inner periphery of the rings 55 and 56 for the same purpose as heretofore described and in the same manner as in FIG. 4.

Referring now to FIGS. 9 and 10, a strip of resilient metal, such as steel, is bevelled at its edges, as shown at 61 and 62. The strip 60 is notched at its opposite edges to form a repeating pattern therealong in the same manner as heretofore described. One edge of the strip 60 has arcuate notches 63 and 65 formed therein and in addition an arcuate cut-out 67 which in turn defines a control point or surface 69 at the end of the arcuate cut-out 63. The opposite edge is formed exactly the same way and is a mirror image. Arcuate cut-outs 64 and 66 correspond with the arcuate cut-outs 65 and 63, respectively, and in addition there is an arcuate notch 68 which together with the arcuate cut-out 66 forms the control point 70. The cut-outs in turn are spaced along the edge of the ring so as to form tab portions 72 and 74. Of course, the cut-outs and notches form vents for the spacer-expander ring 60, and a flexible portion along the line A'B' which is longer than the space between the lines C'C' and D'D'.

The portion between these two latter lines forms the actual flexible portion of the spring ring after it is bent reversely, as shown in FIG. 11, to form the outwardly projecting humps 76 and the inwardly projecting humps 78. As in the prior modifications, the inwardly projecting humps 78 are corrugated at 79 to provide the axial stiffness necessary. These corrugations are such as to form the substantially conical control surfaces 61 and also 62 to bear against the inner periphery of the piston rings.

In all of the modifications herein disclosed, the minimum spacing at the outer edge of the piston rings, such as 30, 31, will be determined by the control points 17 and 18—49 and 50—or 69 and 70, and because of the cut-outs adjacent these control points, the edges of the spacer-expander rings do not contact and are free to flex with respect to the piston rings. These portions of the outer humps on either side of the control points, therefore, become the actual spring portions of the spring ring and are free to flex without interference. These points, aforementioned, such as 17 and 18, are also the fulcrum points or control points about which the camming action of the bevelled edges 23 and 24 on the corrugations 25 takes place. This is true also for the camming action provided by the bevelled edges 41 and 42—and 61 and 62. Thus, from what has been stated, it will be readily apparent that the action of the spacer-expander rings on the piston rings is through a plurality of contact points. This minimizes friction and in effect provides the necessary ring action contributing to a sensitive response of the piston ring assembly to minute changes in cylinder wall dimension. Although the inner humps 20, 52, and 78 are relatively inflexible to small changes in circumference of the spacer-expander control ring, nevertheless, the flexing of the outer humps in each of the modifications is not impeded by friction contact between the piston ring and the spacer-expander ring at any point and the low frictional contact allows the piston rings to move freely on the spacer-expander ring, or vice versa, as the ring elements breathe. In this respect, it differs slightly from the aforementioned patented structure in which the edges in contact with the rails tend to hold the spacer-expander in one position with respect to the rail.

Changes in and modifications of the construction described may be made without departing from the spirit of my invention or sacrificing its advantages.

Having thus described the invention, what is claimed and desired to be secured by Letters Patent is:

1. In a piston ring assembly of the character wherein, (a) a pair of rails whose outer periphery make edgewise engagement with a cylinder wall and are axially separated by a non-bottoming spacer-expander, (b) said spacer-expander having a series of oppositely oriented humps some of whose crests define a major diameter less than the outer diameter of said rails and other of whose crests define a minor diameter less than the diameter of an inner peripheral edge on said rails, (c) said first mentioned humps extending between said rails to separate the same, and (d) at least some of said last-mentioned humps having an arcuate tab extending radially inwardly of said rails in axially overlapping engagement with an inner periphery on one of said rails, the improvement which comprises:
   (1) the locus of engagement between a tab and a rail being defined by a re-entrantly arcuate surface on the tab engaging the rail, said re-entrantly arcuate surface being on a radius less than the internal radius of the rail from a center located within the inner periphery of the rail.

2. The improvement as defined in claim 1 wherein the last-mentioned humps have two tabs one engaging one rail and the other engaging the other rail as defined.

3. In a piston ring assembly of the character wherein, (a) a pair of rails whose outer periphery make edgewise engagement with a cylinder wall and are axially separated by a non-bottoming spacer-expander, (b) said spacer-expander having a series of oppositely oriented humps some of whose crests define a major diameter less than the outer diameter of said rails and other of whose crests define a minor diameter less than the diameter of an inner peripheral edge on said rails, (c) said first-mentioned humps extending between said rails to separate the same, and (d) at least some of said last-mentioned humps having and arcuate tab extending radially inwardly of said rails in axially overlapping engagement with an inner periphery on one of said rails, the improvement which comprises:
   (1) the locus of engagement between a tab and a rail being defined by an axial corrugation with a radially outwardly convex surface and a chamfered edge on said surface in contact with said rail, said outwardly convex surface being on a radius less than that of the rail from a center located within the inner periphery of the rail, and said chamfered edge being inclined radially toward the axis of said rail and axially outward from said humps.

4. The improvement defined in claim 3 wherein the last-mentioned humps have two tabs one engaging one rail and the other engaging the other rail as defined.

5. In a piston ring assembly of the character wherein, (a) a pair of rails whose outer periphery make edgewise engagement with a cylinder wall and are axially separated by a non-bottoming spacer-expander, (b) said spacer-expander having a series of oppositely oriented humps some of whose crests define a major diameter less than the outer diameter of said rails and other of whose crests define a minor diameter less than the diameter of an inner peripheral edge on said rails, (c) said first mentioned humps extending between said rails to separate the same, and (d) at least some of said last-mentioned humps having an arcuate tab extending radially inwardly of said rails in axially overlapping engagement with an inner periphery on one of said rails, the improvement which comprises:
   (1) the locus of engagement between a tab and a rail being defined by a re-entrantly arcuate surface on the tab engaging the rail closer to one radial face thereof than to the other, and said re-entrantly arcuate surface being on a radius less than that of the rail from a center located within the inner periphery of the rail.

6. The improvement defined in claim 5 wherein the last-mentioned humps have two tabs one engaging one rail and the other engaging the other rail as defined.

References Cited in the file of this patent

UNITED STATES PATENTS

| | | |
|---|---|---|
| 2,886,384 | Hamm | May 12, 1959 |
| 2,917,353 | Baumler et al. | Dec. 15, 1959 |

FOREIGN PATENTS

| | | |
|---|---|---|
| 810,247 | Great Britain | Mar. 11, 1959 |